(12) United States Patent
Lin

(10) Patent No.: US 6,406,156 B1
(45) Date of Patent: Jun. 18, 2002

(54) REFLECTIVE PROJECTION LENS FOR A DIGITAL LIGHT PROCESSING PROJECTOR

(75) Inventor: Rung-De Lin, Yunlin Hsien (TW)

(73) Assignee: Acer Peripherals, Inc., Taoyuan (TW)

( * ) Notice: Subject to any disclaimer, the term of this patent is extended or adjusted under 35 U.S.C. 154(b) by 0 days.

(21) Appl. No.: 09/523,349

(22) Filed: Mar. 10, 2000

(30) Foreign Application Priority Data

Mar. 19, 1999 (TW) ......................................... 88104337 A

(51) Int. Cl.⁷ ................................................. G02B 5/10
(52) U.S. Cl. ...................... 359/858; 359/861; 359/730
(58) Field of Search ............................... 359/364, 365, 359/730, 850, 857, 858, 861, 839, 840; 353/99

(56) References Cited

U.S. PATENT DOCUMENTS 4,443,058 A * 4/1984 Bosserman ................. 359/613
4,701,035 A * 10/1987 Hirose ........................ 359/366
5,309,276 A * 5/1994 Rodgers ..................... 359/366
5,867,329 A * 2/1999 Justus et al. ................ 359/861

* cited by examiner

Primary Examiner—Mark A. Robinson
(74) Attorney, Agent, or Firm—Ladas & Parry

(57) ABSTRACT

The present invention provides a reflective projection lens set for a digital light processing projector having a digital mirror device transmitting rays of intended and unintended light. The lens set comprises a first and a second mirror. The first mirror has a reflective surface positioned to receive and therefore reflect the rays of intended light. The second mirror has a reflective surface positioned to receive and therefore reflect the rays of intended light reflected from the first mirror, and an opaque surface on the backside positioned to prevent the rays of unintended light from intruding into the path of the rays of intended light.

18 Claims, 6 Drawing Sheets

REFLECTIVE PROJECTION LENS FOR A DIGITAL LIGHT PROCESSING PROJECTOR

BACKGROUND OF THE INVENTION

1. Field of the Invention

The present invention relates to a projection lens set and particularly to a reflective projection lens set for a digital light processing (DLP) projector, which provides a high projection luminance and image quality, eliminates the problems caused by multi-mirror of image system, shortens the required length of the projection lens set and overcomes the short back focal length (BFL) problem.

2. Description of the Prior Art

A DLP projector comprises a Digital Mirror Device (DMD), for example manufactured by Texas Instrument Corporation, as a basic imaging device. Current commercial DLP projectors utilize transmission lenses to perform projection. FIG. 1 schematically shows a reverse telephoto lens set used in a current DLP. In this drawing, an optical axis was constructed by DMD 1, the first lens 2 and the second lens 3. The light transmitted by the DMD 1 goes through the first lens 2 and the second lens 3 to perform magnification.

The drawbacks of the foregoing reverse telephoto lens will be specified as follows.

First, since a lens with 100% light transmission is not achievable (for example, the transmission ratio of glass is 92%), the light transmitted by the DMD 1 is partly absorbed by the first and second lens. Thus, the projection luminance is decreased by approximately 20%. The quality of the projected image will be deteriorated when the illumination of the light source in the projector is not sufficient.

Second, since there are particular relationships between the object and image distance for projecting the image, a distance between the first and second lens is required. This makes it difficult to shorten the length of the reverse telephoto lenses along the optical axis, which opposes the trend towards lighter and smaller electronic products.

Third, referring to FIGS. 5A and 5B, the DMD is composed of a plurality of pixel mirrors 20. The pixel mirror 20 selectively reflects the incident light to the projection lens set 30 by varying its angle. The light reflected to the projection lens set 30 is called intended light; light not reflected to the projection lens set 30 is called −10° unintended light. The −10° unintended light will interfere with the intended light when not properly dealt with. Since −10° unintended light is generated by DMD and will be magnified by the first lens and second lens during projection, the projected image quality of a DLP will suffer greatly.

Fourth, the first lens 2 and second lens 3 are positioned along and with their centers on the optical axis OP. The DMD 1 is positioned beneath the optical axis OP so that the projected image will be above the optical axis OP. The first lens 2 and second lens 3 should be aligned symmetrically to the optical axis. This constrains the first lens 2 and second lens 3 from being truncated on one side beneath or above the optical axis OP, and makes it difficult to reduce the cost.

SUMMARY OF THE INVENTION

The object of the present invention is to solve the above-mentioned problems and to provide a reflective projection lens set for a DLP projector, which provides a high projection luminance and image quality, eliminates the problems caused by multi-mirror of image system, shortens the required length between the projection lens set, overcomes the short back focal length (BFL) problem and precludes −10° unintended light caused by DMD from interference.

Another object of this invention is to reduce the production cost. It utilizes the first mirror located beneath the optical axis and the second mirror located above the optical axis for projection. Thus, the parts of the first mirror above the optical axis and the second mirror beneath the optical axis may be truncated. The lens size could be diminished to save cost.

To achieve the above-mentioned objects, the reflective projection lens set for a digital light processing projector with a digital mirror device comprises a first and a second mirror. The first mirror has a reflective surface positioned to receive and therefore reflect the rays of intended light. The second mirror has a reflective surface positioned to receive and therefore reflect the rays of intended light reflected from the first mirror, and an opaque surface on its backside to prevent the rays of unintended light from intruding into the path of the rays of intended light.

In the foregoing reflective projection lens set, the first and the second mirror may be a combination of concave, convex, curved or paraboloid mirror.

In addition, the foregoing reflective projection lens set further comprises a lens module positioned in an optical path starting from the digital mirror device, turning at the first mirror and to the second mirror, whereby an image magnification or correction is carried out. The lens module may be arranged between the DMD and the first mirror, or the first and second mirror.

Moreover, the DMD is positioned beneath an optical axis and the rays of intended light re-reflected by the second mirror are projected above the optical axis. The parts of the first mirror above and the second mirror beneath the optical axis may be truncated.

Furthermore, in another embodiment of the present invention, the foregoing reflective projection lens set further comprises a third and fourth mirror. The third mirror has a reflective surface positioned to receive and therefore reflect the rays of intended light reflected from the second mirror. The fourth mirror has a reflective surface positioned to receive and therefore reflect the rays of intended light reflected from the third mirror, and an opaque surface on its backside to prevent the rays of unintended light from intruding into the path of the rays of intended light.

BRIEF DESCRIPTION OF THE DRAWINGS

The present invention will become more fully understood from the detailed description given hereinbelow and the accompanying,drawings, given by way of illustration only and thus not intended to be limitative of the present invention.

DETAILED DESCRIPTION OF THE PREFERRED EMBODIMENTS

Referring to FIGS. 2A~2D, the reflective projection lens set for a DLP projector comprises a first mirror 2' and a second mirror 3' positioned along an optical axis OP'. The DMD 1 transmits rays of intended and −10° unintended light. The first mirror 2' or second mirror 3' may be a convex, concave, curved or paraboloid mirror.

Figure 1:
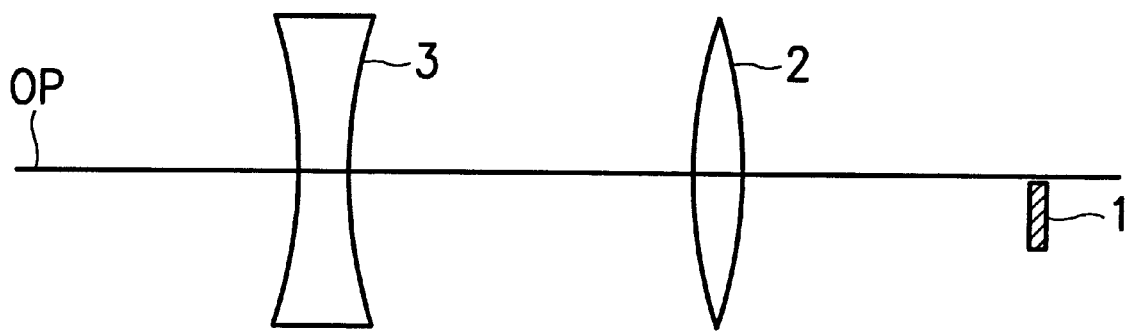
FIG. 1 schematically shows the reverse telephoto lenses.
Figure 2A:
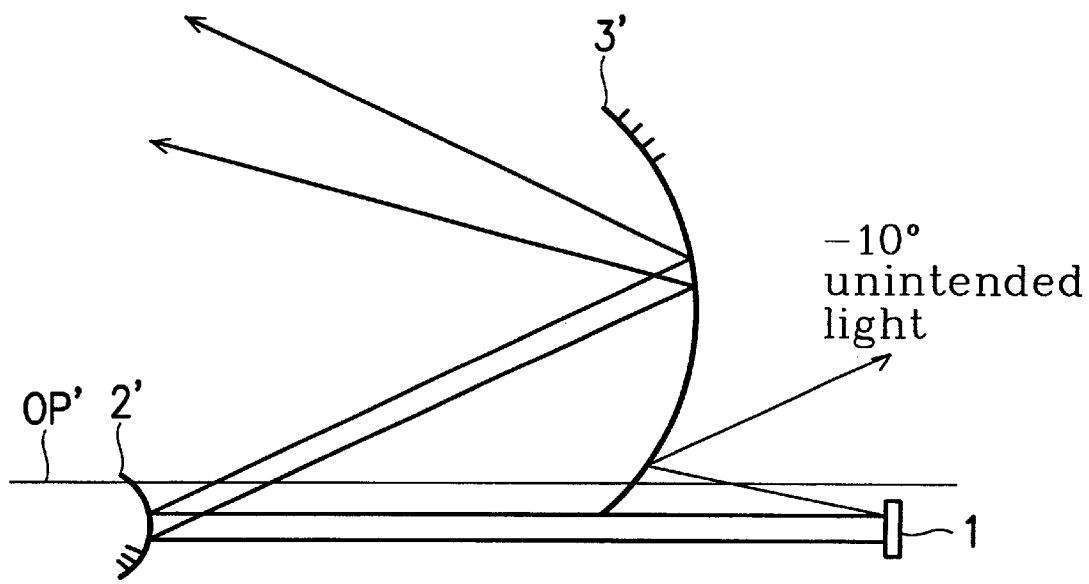
FIGS. 2A~2D schematically shows the reflective projection lens set according to embodiments of the invention.

FIG. 2A shows the case wherein the first mirror 2' and second mirror 3' are the convex and concave mirror respectively. The DMD 1 is positioned beneath and close to the optical axis OP' so that the projected image appears above the optical axis OP'. The first mirror 2' has a reflective surface positioned to receive and therefore reflect the rays of intended light transmitted from the DMD 1. The second mirror 3' has a reflective surface positioned to receive and therefore reflect the rays of intended light reflected from the first mirror 2', and an opaque surface on its backside positioned to prevent the rays of −10° unintended light from intruding into the path of the rays of intended light. Thereby, the magnification of the projected image is carried out.

The advantages of the foregoing reflective projection lens set will be explained.

First, since the reflective mirrors substitute for the transmission lenses in the prior art, the projection luminance does not greatly decrease due to the limited transmission ratio of the lens.

Second, the travel distance of the intended light is increased by the reflection of the first mirror 2' and second mirror 3'. Thereby, the length of the reflective projection lens set along the optical axis OP' is shortened. This complies with the trend towards lighter and smaller electronic products.

Third, by moving the second mirror 3' downward to a proper position, the −10° unintended light is obstructed by the opaque surface on the backside of the second mirror 3'. Thus, the second mirror 3' obstructs −10° unintended light without hindering DMD 1 to transmit rays of intended light. One preferred embodiment shows that the opaque surface on the backside of the second mirror 3' coated with a reflective film avoids temperature of the second mirror from rising up after absorbing the unintended light and also prevents the interference of the −10° unintended light with the intended light. Thus, image quality is enhanced.

Fourth, the first mirror 2' and second mirror 3' may be truncated to the extent that there is sufficient surface area for the two mirrors to receive and reflect the rays of intended light. Therefore, the parts of the first mirror 2' above and the second mirror 3' beneath the optical axis OP' may be truncated and the lens size can be reduced.

Figure 2B:
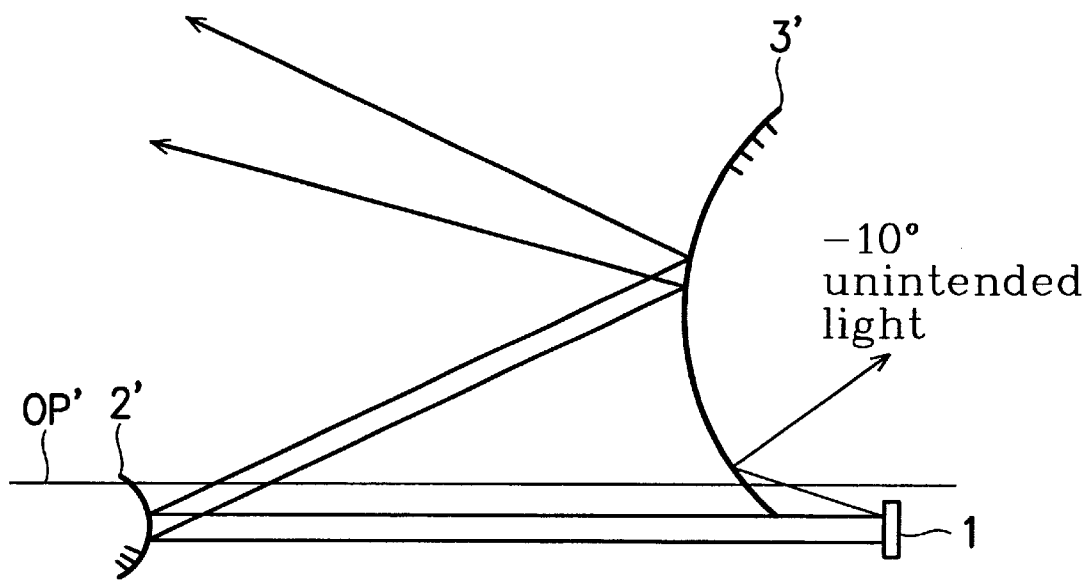
Figure 2C:
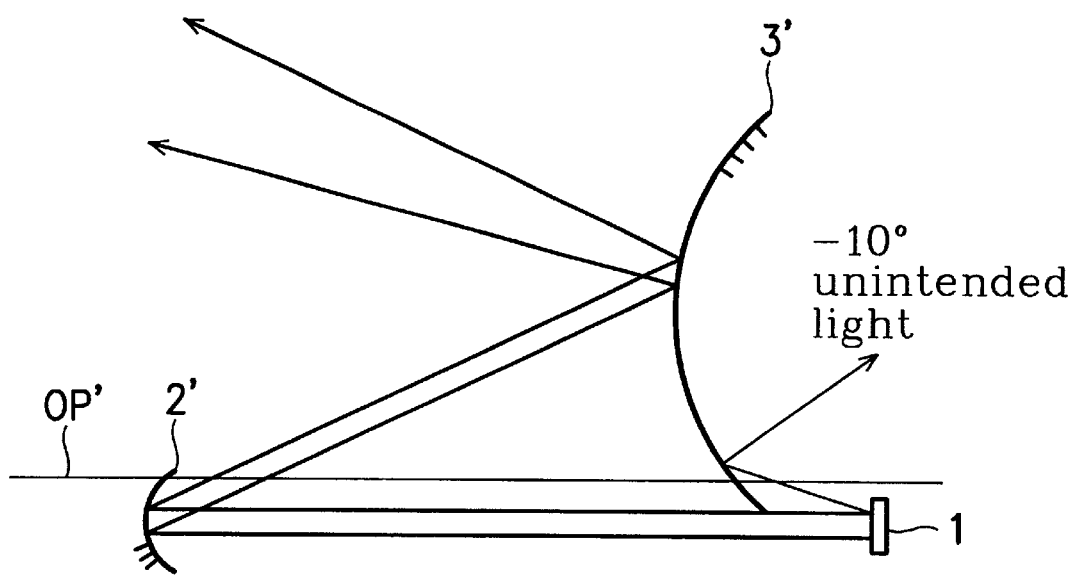
Figure 2D:
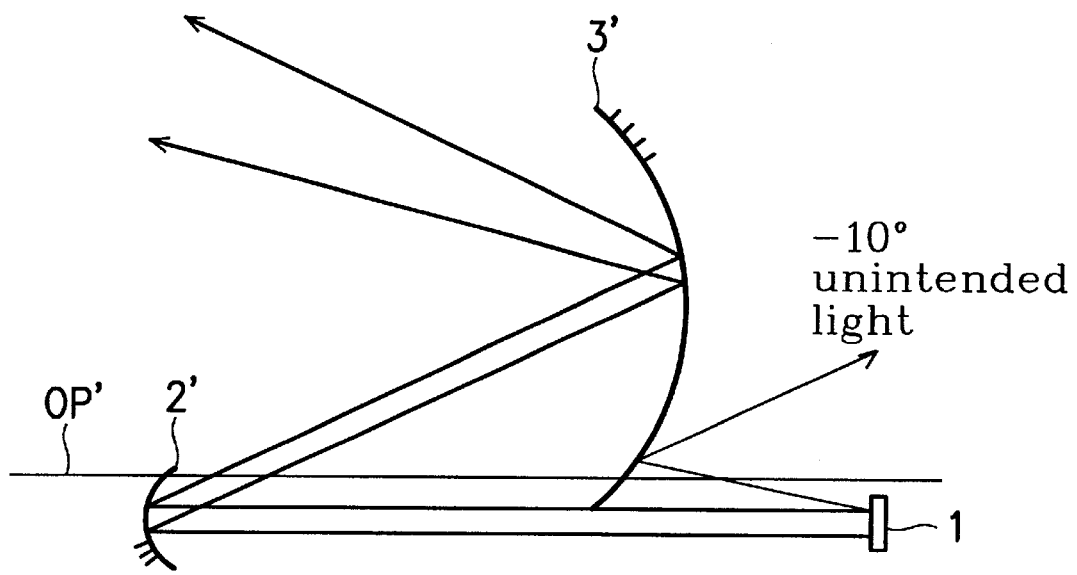

FIG. 2B shows the case wherein the first mirror 2' and second mirror 3' are both the convex mirrors. FIG. 2C shows the case wherein the first mirror 2' and second mirror 3' are the concave and convex mirror respectively. FIG. 2D shows the case wherein the first mirror 2' and second mirror 3' are both the concave mirrors. The operations and advantages of the reflective projection lens sets shown in FIGS. 2B~2C are similiar to those of the reflective projection lens set shown in FIG. 2A, and the main distinction between them is the characteristic of the magnification and projected image. Additionally, as mentioned above, it may be the case where the first mirror 2' or second mirror 3' is a curved mirror or paraboloid mirror. However, they are not described here because they are schematically similar to the convex and concave mirror.

Figure 3A:
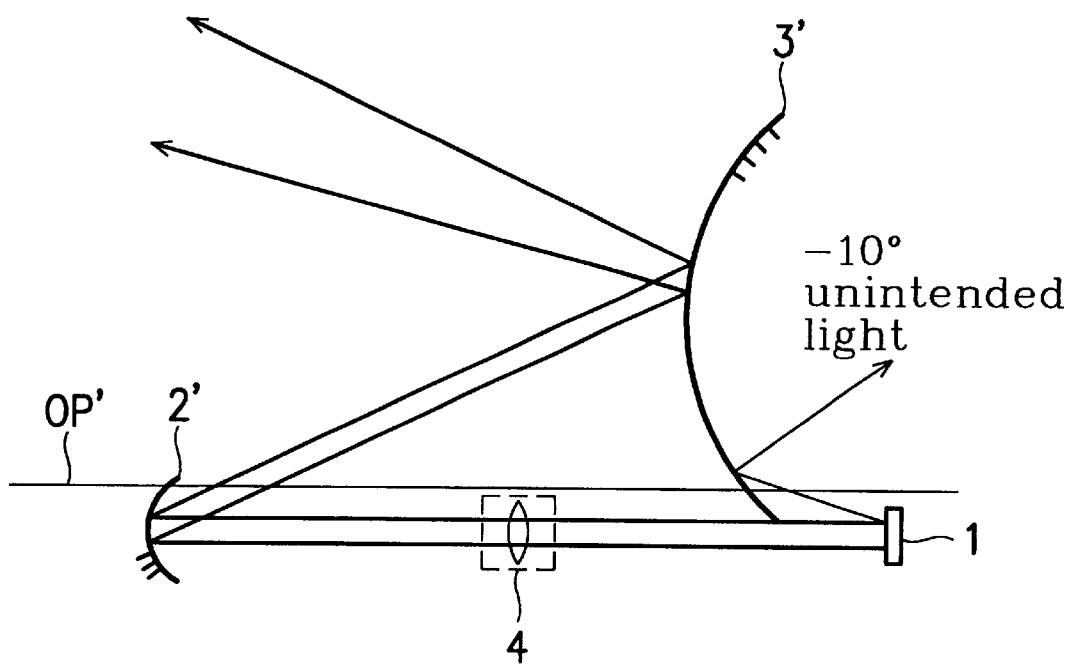
FIG. 3A schematically shows the reflective projection lens set according to one embodiment of the invention.
Figure 3B:
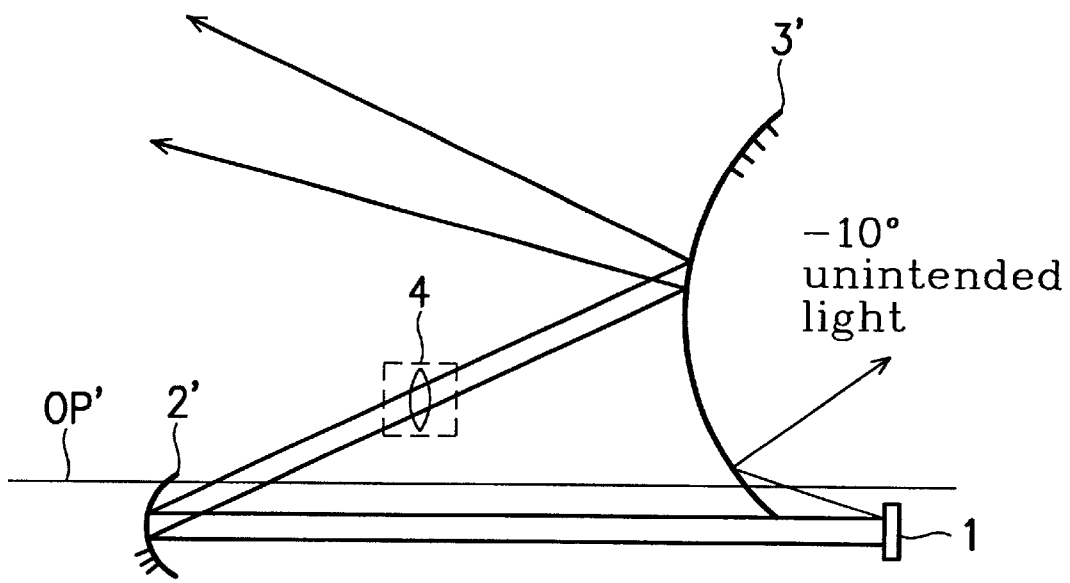
FIG. 3B schematically shows the reflective projection lens set according to another embodiment of the invention.

FIGS. 3A and 3B schematically shows the reflective projection lens set according to two further embodiments of the invention; wherein the reflective projection lens set further comprises a lens module in the optical path from the DMD 1, the first mirror 2' to the second mirror 3' for image magnification or correction.

Referring to FIG. 3A, the reflective projection lens set further comprises a lens module 4 between the DMD 1 and the first mirror 2'.

Referring to FIG. 3B, the reflective projection lens set further comprises a lens module 4 between the first mirror 2' and the second mirror 3'.

Figure 4:
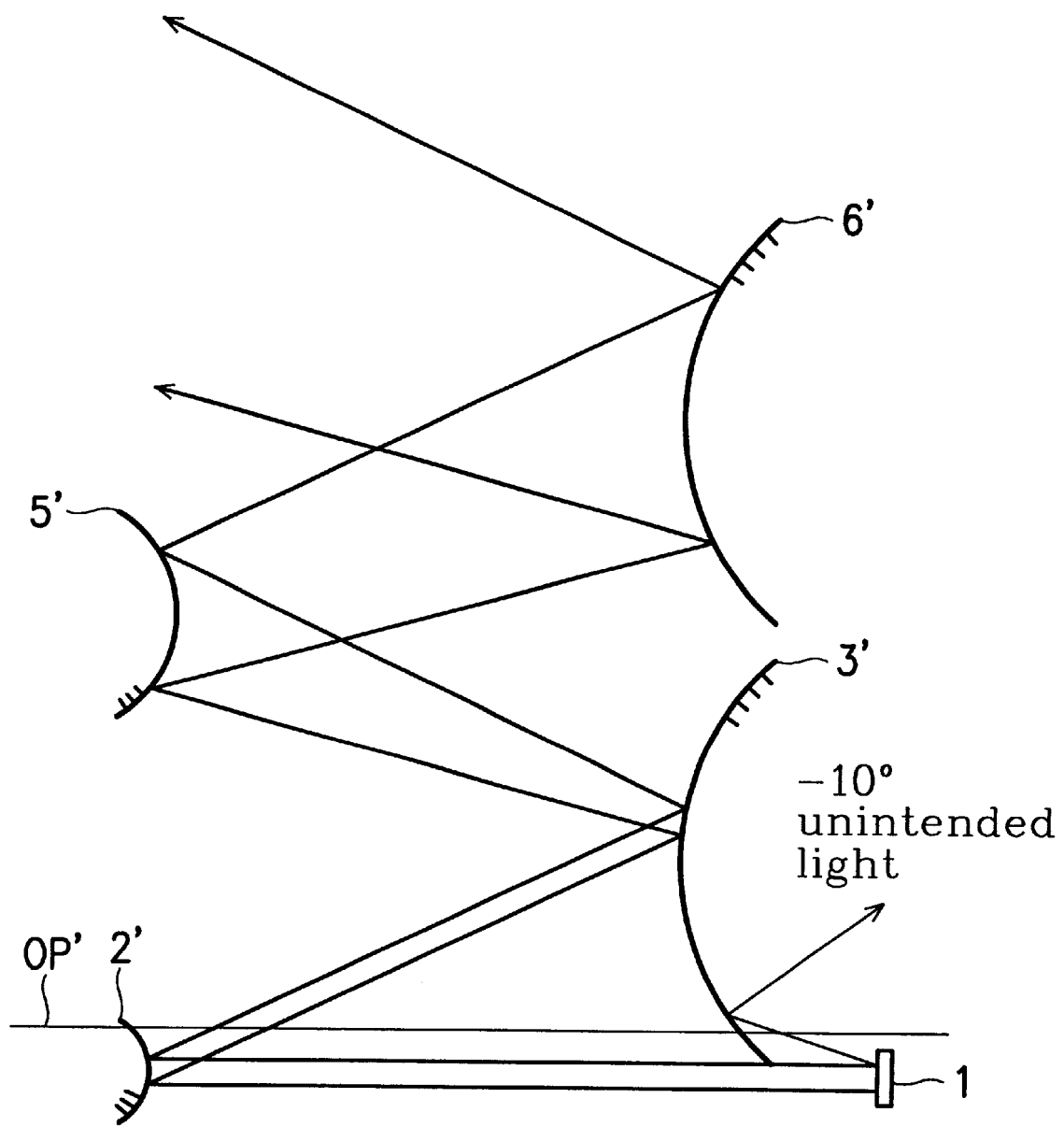
FIG. 4 schematically shows the reflective projection lens set according to still another embodiment of the invention.
Figure 5A:
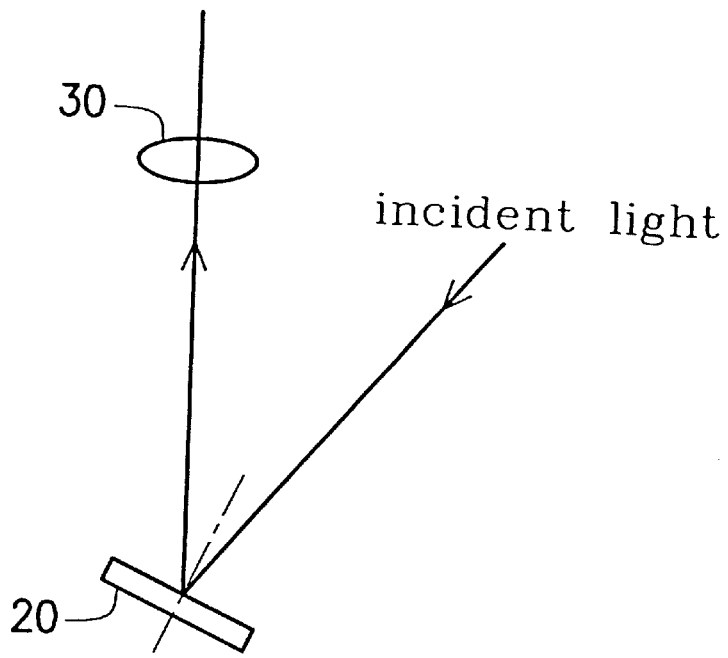
FIGS. 5A and 5B schematically shows the pixel mirror of the DMD.
Figure 5B:
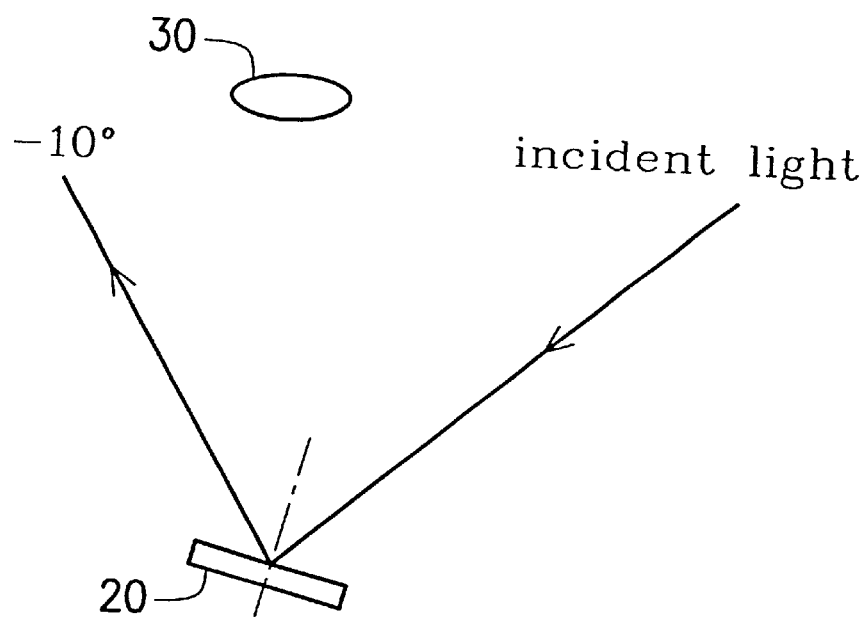

FIG. 4 schematically shows the reflective projection lens set according to another embodiment of the invention. The reflective projection lens set further comprises a third mirror 5' and fourth mirror 6'. The third mirror 5' has a reflective surface positioned to receive and therefore reflect the rays of intended light reflected from the second mirror 3'. The fourth mirror 6' has a reflective surface positioned to receive and therefore reflect the rays of intended light reflected from the third mirror 5', and an opaque surface on the backside positioned to prevent the rays of −10° unintended light from intruding into the path of the rays of intended light. Thereby, the travel distance of the intended light is further increased so that the length of the reflective projection lens set may be shorter.

The foregoing description of the preferred embodiments of this invention has been presented for purposes of illustration and description. Obvious modifications or variations are possible in light of the above teaching. The embodiments were chosen and described to provide the best illustration of the principles of this invention and its practical application to thereby enable those skilled in the art to utilize the invention in various embodiments and with various modifications as are suited to the particular use contemplated. All such modifications and variations are within the scope of the present invention as determined by the appended claims when interpreted in accordance with the breadth to which they are fairly, legally, and equitably entitled.

What is claimed is:

1. A reflective projection lens set for a digital light processing projector having a digital mirror device capable of transmitting rays of intended and unintended light, the lens comprising:

a first mirror with a reflective surface positioned to receive and therefore reflect the rays of the intended light; and a second mirror with a reflective surface positioned to receive and therefore reflect the rays of the intended light reflected from said first mirror, and a reflective opaque surface on the backside positioned to reflect and prevent the rays of the unintended light from intruding into the path of the rays of the intended light.

2. The reflective projection lens set as claimed in claim 1, wherein said first mirror is a convex mirror.

3. The reflective projection lens set as claimed in claim 1, wherein said first mirror is a concave mirror.

4. The reflective projection lens set as claimed in claim 1, wherein said first mirror is a curved mirror.

5. The reflective projection lens set as claimed in claim 1, wherein said first mirror is a paraboloid mirror.

6. The reflective projection lens set as claimed in claim 1, wherein said second mirror is a convex mirror.

7. The reflective projection lens set as claimed in claim 1, wherein said second mirror is a concave mirror.

8. The reflective projection lens set as claimed in claim 1, wherein said second mirror is a curved mirror.

9. The reflective projection lens set as claimed in claim 1, wherein said second mirror is a paraboloid mirror.

10. The reflective projection lens set as claimed in claim 1 further comprising a lens module positioned in an optical path starting from the digital mirror device, turning at said first mirror and then to said mirror, whereby an image magnification or correction is carried out.

11. The reflective projection lens set as claimed in claim 10, wherein the lens module is positioned between the digital mirror device and said first mirror.

12. The reflective projection lens set as claimed in claim 10, wherein the lens module is positioned between said first mirror and, said second mirror.

13. The reflective projection lens set as claimed in claim 1 further comprising:
 a third mirror with a reflective surface positioned to receive and therefore reflect the rays of intended light reflected from the second mirror; and
 a fourth mirror with a reflective surface positioned to receive and therefore reflect the rays of intended light reflected from the third mirror, and an opaque surface on the backside positioned to prevent the rays of unintended light from intruding into the path of the rays of intended light.

14. The reflective projection lens set as claimed in claim 1, wherein the reflective opaque surface comprises a reflective film applied to the backside of the second mirror.

15. A reflective projection lens set for a digital light processing projector having a digital mirror device capable of transmitting rays of intended and unintended light, the lens comprising:
 a first mirror with a reflective surface positioned to receive and therefore reflect the rays of the intended light; and
 a second mirror with a reflective surface positioned to receive and therefore reflect the rays of the intended light reflected from said first mirror, and an opaque surface on the backside positioned to prevent the rays of the unintended light from intruding into the path of the rays of the intended light, wherein the digital mirror device is positioned beneath an optical axis and the rays of the intended light rereflected by the second mirror are projected above the optical axis.

16. The reflective projection lens set as claimed in claim 15, wherein the parts of the first mirror above and the second mirror beneath the optical axis are truncated.

17. A reflective projection lens set for a digital light processing projector having a digital mirror device capable of transmitting rays of intended light along a first optical path and rays of unintended light along a second optical path, the first optical path being substantially different from the second optical path, the lens comprising:
 a first mirror with a reflective surface positioned on the first optical path to receive and reflect the rays of the intended light; and
 a second mirror with a reflective surface positioned from said first mirror, and an opaque surface on the backside positioned on the second optical path to prevent the rays of the unintended light from intruding into the first optical path of the rays of the intended light.

18. The reflective projection lens set as claimed in claim 17, wherein the unintended light is a −10° unintended light transmitted from the digital mirror device.

* * * * *